(12) United States Patent
Schulze

(10) Patent No.: US 10,527,156 B2
(45) Date of Patent: Jan. 7, 2020

(54) METHOD AND DEVICE FOR OPERATING A MOTOR VEHICLE

(71) Applicant: AUDI AG, Ingolstadt (DE)

(72) Inventor: Sebastian Schulze, Kösching (DE)

(73) Assignee: AUDI AG, Ingolstadt (DE)

( * ) Notice: Subject to any disclaimer, the term of this patent is extended or adjusted under 35 U.S.C. 154(b) by 154 days.

(21) Appl. No.: 15/528,113

(22) PCT Filed: Nov. 19, 2015

(86) PCT No.: PCT/EP2015/077088
§ 371 (c)(1),
(2) Date: Jun. 20, 2017

(87) PCT Pub. No.: WO2016/079234
PCT Pub. Date: May 26, 2016

(65) Prior Publication Data
US 2017/0335948 A1 Nov. 23, 2017

(30) Foreign Application Priority Data
Nov. 20, 2014 (DE) ........................ 10 2014 017 175

(51) Int. Cl.
*B60K 23/02* (2006.01)
*F16H 59/04* (2006.01)
(Continued)

(52) U.S. Cl.
CPC ......... *F16H 59/0204* (2013.01); *B60K 23/02* (2013.01); *F16H 59/044* (2013.01);
(Continued)

(58) Field of Classification Search
CPC .. F16H 59/0204; F16H 59/105; F16H 59/044; F16H 61/22; F16H 61/0248;
(Continued)

(56) References Cited

U.S. PATENT DOCUMENTS 5,095,434 A 3/1992 Lupo et al.
5,406,861 A * 4/1995 Steeby .................... F16H 59/08
477/78
(Continued)

FOREIGN PATENT DOCUMENTS

CN 102826082 A 12/2012
CN 103477125 A 12/2013
(Continued)

OTHER PUBLICATIONS

International Search Report and Written Opinion dated Feb. 12, 2016 of corresponding application No. PCT/EP2015/077088; 14 pgs.
(Continued)

*Primary Examiner* — Jacob S. Scott
*Assistant Examiner* — Lillian T Nguyen
(74) *Attorney, Agent, or Firm* — Maier & Maier, PLLC

(57) ABSTRACT

A method for operating a motor vehicle, in particular a passenger vehicle, having at least one drive engine and an automatic transmission. A motor vehicle with conventional shift transmission is imitated by providing a clutch pedal for separating the drive connection, a shift lever for the manual shifting of the gear ratios, and an electronic control unit, by which the functions of clutching and shifting are converted into corresponding control signals for the automatic transmission.

9 Claims, 2 Drawing Sheets

(51) Int. Cl.
*F16H 61/02* (2006.01)
*F16H 59/02* (2006.01)
*F16H 59/10* (2006.01)
*F16H 61/22* (2006.01)
*F16H 61/24* (2006.01)

(52) U.S. Cl.
CPC ....... *F16H 59/105* (2013.01); *F16H 61/0248* (2013.01); *F16H 61/22* (2013.01); *F16H 2059/0221* (2013.01); *F16H 2059/0282* (2013.01); *F16H 2061/242* (2013.01)

(58) Field of Classification Search
CPC ....... F16H 2061/242; F16H 2059/0282; F16H 2059/0221; F16H 59/02; G05G 5/03; B60K 23/02; B60W 10/113; B60W 10/02; B60W 2540/14; B60W 2540/16
See application file for complete search history.

(56) References Cited

U.S. PATENT DOCUMENTS

| | | | | |
|---|---|---|---|---|
| 5,415,056 | A * | 5/1995 | Tabata | F16H 59/0204 74/335 |
| 6,819,997 | B2 * | 11/2004 | Buchanan | B60W 10/06 477/70 |
| 2007/0130931 | A1 | 6/2007 | Burgart et al. | |
| 2011/0036191 | A1 * | 2/2011 | Wolterman | F16D 48/06 74/473.12 |

FOREIGN PATENT DOCUMENTS

| | | | |
|---|---|---|---|
| DE | 10195141 T5 | 4/2003 | |
| DE | 10307508 A1 | 10/2003 | |
| DE | 102004061100 A1 | 7/2005 | |
| DE | 102006026975 A1 | 1/2007 | |
| DE | 102010049758 A1 | 5/2012 | |
| DE | 102012210359 A1 | 12/2013 | |
| DE | 102013223615 A1 | 5/2015 | |
| EP | 0685664 A2 * | 12/1995 | ......... F16H 59/0204 |
| EP | 2101074 A2 | 9/2009 | |
| EP | 2239484 A1 | 10/2010 | |
| EP | 2253861 A2 | 11/2010 | |
| EP | 2902296 A2 | 8/2015 | |

OTHER PUBLICATIONS

Office Action dated Sep. 11, 2015 of corresponding application No. DE10 2014 017 175.2; 5 pgs.

Chinese Office Action dated Jul. 20, 2018, in connection with corresponding CN Application No. 201580072305.6 (17 pgs., including English translation).

International Preliminary Report on Patentability dated May 23, 2017 of corresponding International application No. PCT/EP2015/077088; 13 pgs.

Chinese Office Action dated Apr. 10, 2019, in connection with corresponding CN Application No. 201580072305.6 (18 pgs., including English translation).

Chinese Office Action dated Sep. 17, 2019, in connection with corresponding CN Application No. 201580072305.6 (8 pgs., including machine-generated English translation).

* cited by examiner

METHOD AND DEVICE FOR OPERATING A MOTOR VEHICLE

FIELD

Embodiments of the present invention relate to a method for operating a motor vehicle.

BACKGROUND

In the case of motor vehicles, it is generally common to equip them with automatic transmissions (without clutch pedal) or with shift transmissions and clutch pedals for changing gears. In addition, automated shift transmissions (for example, dual clutch transmissions) are employed in many cases. In the case of automatic transmissions, for example, fixed gear ratios in automatic operation can be manually controlled by defined selector level positions. The acceptance of either automatic transmissions or shift transmissions is not clear, so that the vehicle manufacturer sets aside a not inconsiderable expense for development and manufacturing of both types of transmission.

The object of the invention is to provide a method for operating a motor vehicle and a device for implementing the method, by means of which both types of operation can be taken into account with reduced development expense.

SUMMARY OF THE DISCLOSURE

It is proposed according to the invention that in the case of a motor vehicle of the generic type having automatic transmission, at the wish of the driver, means having a clutch pedal for the subjective separation of the drive connection, a shift lever for the manual shifting of the gear ratios, and an electronic control unit are provided, by means of which the functions of clutching and shifting are converted into corresponding control signals for the automatic transmission.

The core concept of the invention is to offer a motor vehicle with quasi-manual transmission, which can be analogously operated using the clutch pedal and shift lever as usual, but in final analysis is equipped with an automatic transmission. This makes it possible to no longer need to provide shift transmissions, at least in defined production lines (for example, for high engine powers), but rather to replace them by existing automatic transmissions. For the purchaser of the motor vehicle, the driving operation is as usual or as desired, corresponding to manual transmission with clutch actuation and manual shifting.

In this case, the clutch pedal can be designed preferably similar to the clutch actuation of the manually shifted motor vehicle with respect to pedal force and clutch function, but this can be transferred to control by the automatic transmission. Further, the pedal force and/or the clutch function can be variably controllable in order to mediate, for example, a sporty or comfortable esthetic.

In addition, the shift lever can be arranged in a shift guide plate imitating a manually shifted transmission, and by means of this guide, a defined number of forward gears and a reverse gear, in addition to an idle slot, can be shifted, whereby the shift signals are converted via the electronic control unit into a corresponding control of the automatic transmission in fixed gear ratios. Therefore, the vision of a motor vehicle with the usual manual shifting can be advantageously reinforced.

In particular, the shift lever can be shifted in a shift guide plate that corresponds to an H shift pattern which is known in manually shifted motor vehicles, and catching and shifting force that are common in manually shifted motor vehicles can be simulated.

In addition, it is proposed that when the clutch pedal is not activated, the shift lever in the shift guide plate is electronically or mechanically blocked in order to avoid erroneous shifts; a shift process can thus be initiated only when there is a corresponding clutch actuation.

In an advantageous enhancement of the method, the electronic control unit of the automatic transmission can be switchable from manual shifting to automatic shifting by a switching means, whereby the control signals of the clutch pedal and the shift lever can then be correspondingly suppressed. Therefore, by taking into consideration electronic control units that are already present for automatic transmission, the latter can be modified for both types of operation (manual shift, automatic operation) with little additional expense.

In this case, electrical displays can be provided in a particularly advantageous way in the shift guide plate, and these displays can be changed into drive operation modes (for example, D, S, R, P) when the electronic control unit is switched to automatic operation from gear displays (for example, 1-6, R), in order to provide reliable displays of the selector lever positions or shift positions in both types of operation.

A particularly preferred device for implementing the method on a motor vehicle having at least one drive engine and an automatic transmission is composed of a clutch means with a pivotably mounted clutch pedal and an actuator simulating clutch actuation forces; a shift actuating means corresponding to a manual transmission with an actuator simulating corresponding gear positions and an idle; and the actuators emit electrical signals for the control of the automatic transmission in a manual shift mode.

In this case, an electrical two-way switch can be provided, by means of which the motor vehicle can be switched to automatic vehicle operation, in which the signals of the clutch means and the shifting means are suppressed. The motor vehicle can be driven correspondingly in manual shift mode or in automatic mode, whereby the extra expense for control technology is relatively small.

Finally, the automatic transmission can be a dual clutch transmission, which is known in and of itself, the two clutches of which are correspondingly activated in manual shift operation via the clutch pedal and the shift actuators of which are activated via the shift actuation.

BRIEF DESCRIPTION OF THE DRAWINGS

An exemplary embodiment of the invention is described in more detail below.

Herein.

DETAILED DESCRIPTION OF THE DRAWINGS

Figure 1:
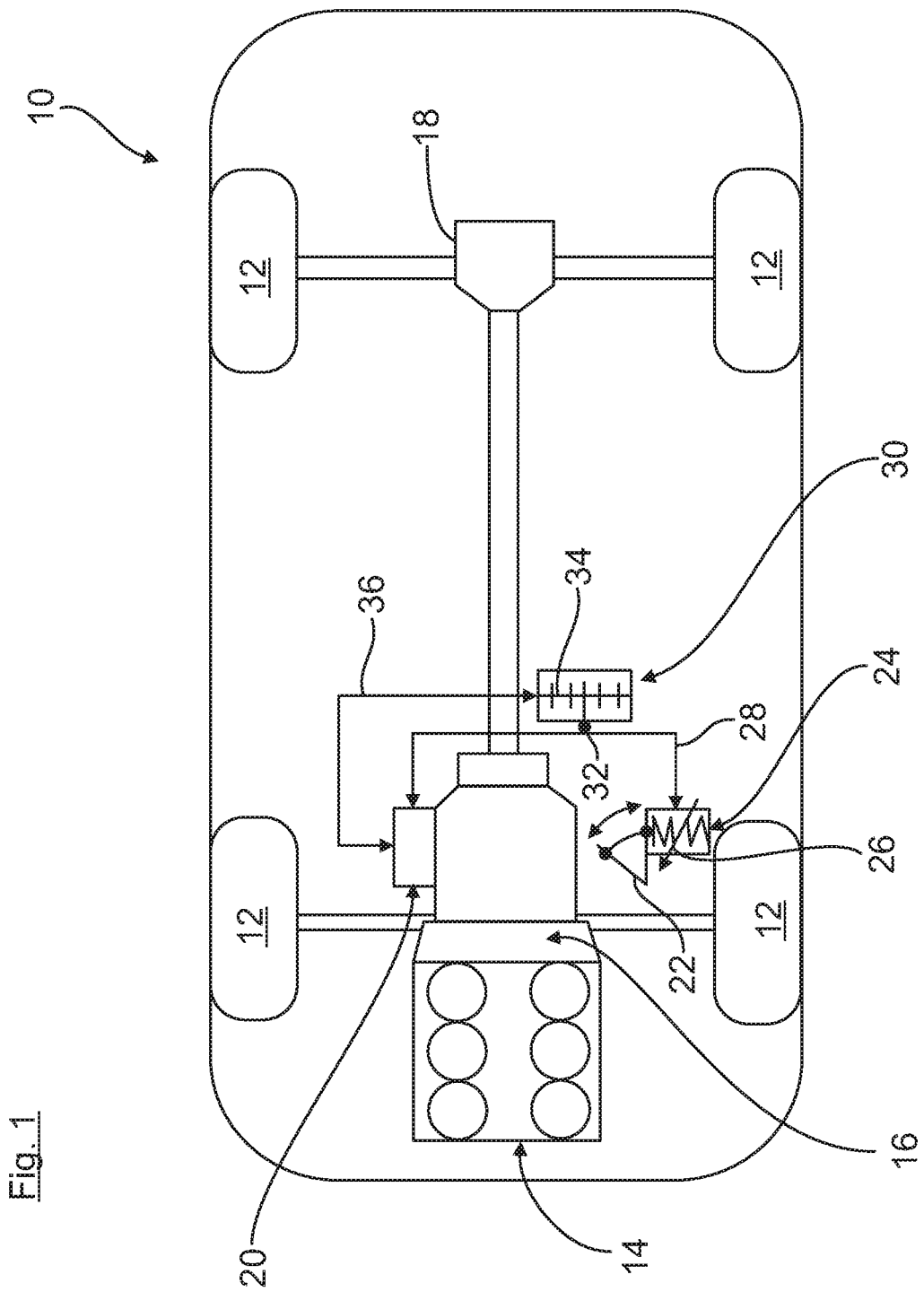
FIG. 1 shows the drive system of an all-wheel drive passenger automobile, having a drive engine and an automatic dual clutch transmission as a block diagram, wherein a manual shift mode can be simulated by arrangement of a clutch pedal and a shift guide plate with shift lever.
Figure 2:
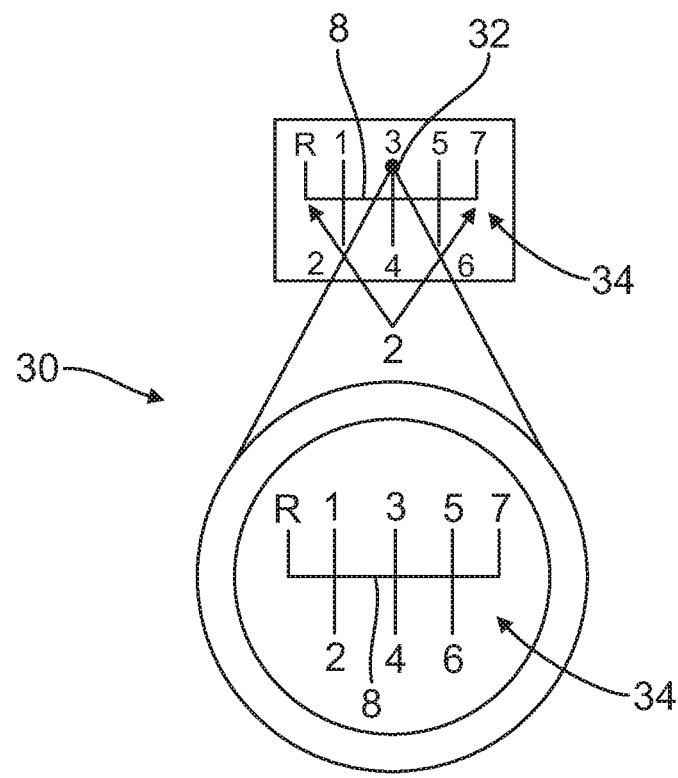
FIG. 2 shows a diagrammatic top view onto the shift guide plate, by means of which several forward gears and a reverse gear can be manually shifted.

As a block diagram and roughly schematically, a passenger vehicle 10 is shown in FIG. 1, the front and rear wheels 12 of which can be driven in the known way via a drive system with a drive engine or internal combustion engine 14, an automatically shiftable transmission, in particular a dual clutch transmission 16 as a speed-change transmission, and with differential gears 18 connected downstream in the flow of forces (the front differential gear is integrated into the dual clutch transmission).

The drive system shown with longitudinally mounted internal combustion engine 14 and direct-mounted dual clutch transmission 16 can also be arranged in the motor vehicle in crosswise installation in the front or in the rear or in a longitudinal arrangement with central engine, etc.

The dual clutch transmission 16 can be controlled by means of an electronic control unit 20, by means of which the two integrated clutches and the gear shifts are controlled in both gears/transmission parts for shifting the gear ratios or gears via electro-hydraulically activated actuators. Reference is made here to the known, frequently applied designs known in the prior art.

The drive system with the dual clutch transmission 16 can be operated via the modified electronic control unit 20 in a manual shift mode corresponding to a motor vehicle with shift transmission or in the automatic mode, which is known in and of itself. The control can also be designed, however, in such a way that only a manual shift mode can be present.

Deviating from the usual design in motor vehicles with automatic transmissions, the pedal system is designed so that, in addition to the usual brake pedal and gas pedal (not shown), a clutch pedal 22 with an actuator 24 is also installed.

The actuator 24 has a hydraulically damped spring 26 and is structurally designed so that it produces a pedal force or force-displacement curve analogous to the usual clutch actuation. Optionally, the simulated clutch actuation can be changed, for example, into a sporty design or a comfortable design via an adjusting means (not shown), with corresponding activation of the clutches in the dual clutch transmission 16.

The actuator 24 on the clutch pedal 22 is connected by signal technology (line 28) to the transmission electronic control unit 20 and thus controls, for example, by way of a potentiometer in the manual shift mode, the disengaging and engaging of the two clutches, which are simultaneously or alternatingly disengaged for simulating a shift transmission interrupting the tractive force with a change in gear and then engaged again in a targeted manner, more rapidly or more slowly, depending on the actuation of the clutch pedal.

Further, a shifting means 30 is provided in the motor vehicle, and this shifting means makes possible a shift actuation of a shift lever 32 in a predetermined sliding guide plate 34. The actuation of the shift lever (32) in the shift guide plate (34) can preferably imitate a catching and shifting force in manually shifted motor vehicles.

The actuator is further provided with a locking means (not shown), by means of which, the shift lever 32 is blocked either electronically or mechanically when the clutch pedal 22 is not actuated; consequently, it can only be shifted when the clutch pedal 22 is depressed.

The shifting means 30 with the shift lever 32 is also connected by signal technology to the transmission electronic control unit 20, as is indicated by the line 36 in FIG. 1 and can emit electrical signals corresponding to the position of the shift lever 32 to the modified electronic control unit 20.

In the manual shift mode of the drive system, the motor vehicle 10 is operated like a conventional motor vehicle with shift transmission. This means that for shifting, the clutch is first disengaged and then the gears are shifted correspondingly by way of the shift lever 32. In this case, both the actuator of the clutch pedal 22 as well as the actuator of the shifting means 30 emit electrical signals to the modified electronic control unit 20, which converts these signals into the automatic transmission control of the dual clutch transmission 16.

Neither the clutch means 24 nor the shifting means 30 are mechanically connected to the dual clutch transmission 16 (clutch and shift by wire).

Further, a two-way switch (not shown) can be provided in the motor vehicle, for example, on the shifting means 30, and this switch can switch the transmission control to automatic operation.

In this case, the actuator of the shifting means 30 (see FIG. 3) is designed so that it only still allows modified shifting paths of the shift lever 32 in the shift guide plate 34', whereby the preferred electrical shift displays of gear displays 1 to 7, etc. are switched into automatic driving modes (for example, R, S, D, P, etc.).

Figure 3:
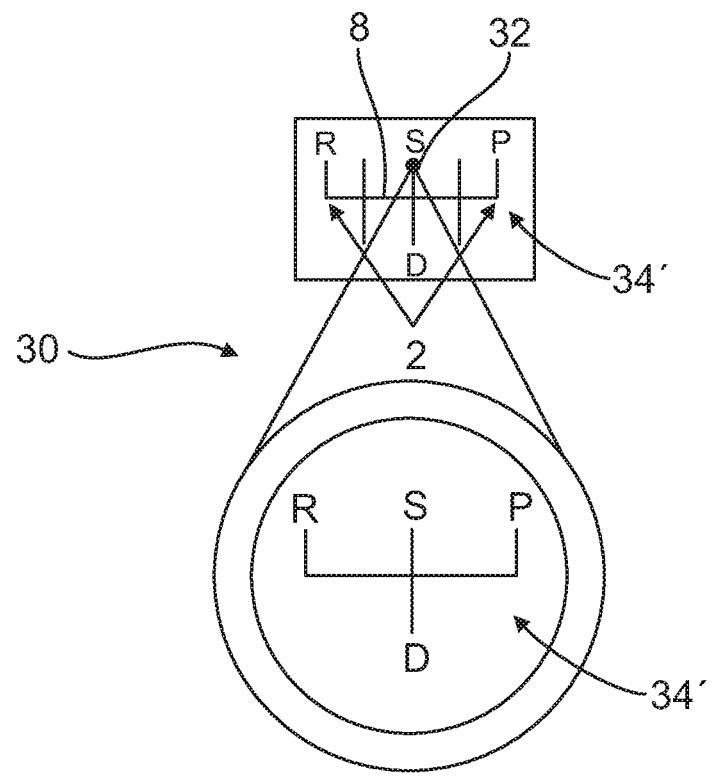
FIG. 3 shows the shift guide plate according to FIGS. 1 and 2 in an electrically switched version for operating the drive system in an automatic mode.

If the automatic driving operation is selected via the two-way switch, which is not shown, then the corresponding electrical signals for the actuation of the clutch pedal 22 and the gear signals of the manual shift mode will be suppressed, and the transmission electronic control unit 20 switches the driving operation into automatic transmission of the usual type, only still controlled via the shift lever 32 but now functioning as a selector lever 32 (FIG. 3). Optionally, the clutch means 24 can be designed so that in the automatic mode, the clutch pedal 22 is maintained in a retracted (semi-disengaged) position.

The proposed use of the automated changeable transmission or preferably dual clutch transmission 16 also has additional advantages in the manual shift mode with respect to transmission control for safeguarding a reliable, comfortable driving operation.

For example, more rapid shifting procedures can be represented on shift lever 32 in a targeted manner with extremely short shifting paths if desired. Also, interventions such as protection of the internal combustion engine 12 from stalling in the case of a clutch release that is too fast, support on startup, decoupling the internal combustion engine 12 in overrun operation (sailing), etc., as in the case of motor vehicles with automatic operation, can be superimposed on the manual shift mode.

The desire of the driver can be anticipated at an early time, if desired, by way of a sensor in or on the shift lever 32, for example. If this sensor is shifted from the gear position into the idle slot 8 when the clutch is depressed, the transmission 16 is shifted into neutral when the clutches are disengaged. Then, if a gear slot is selected, the corresponding targeted gear can be already pre-selected in the transmission, whereby the change in gear is rapidly conducted and, if desired, the internal combustion engine 12 can be activated smoothly by way of a speed synchronization.

If the clutch pedal 22 is inadvertently not activated in the shift mode, then the shift lever 32 is blocked via the actuator of the shifting means 30, in order exclude erroneous shifts or disruptions in the transmission control.

The invention claimed is:
1. A method for operating a motor vehicle, comprising:
receiving an input, by at least one of a clutch pedal and a shift lever, for at least one function of the clutching and the shifting of an automatic transmission of the motor vehicle;

transmitting, by the at least one of the clutch pedal and the shift lever, the input of the at least one function of the clutching and the shifting of the automatic transmission to an electronic control unit via a direct connection; and converting, by the electronic control unit, the input of the at least one function of the clutching and the shifting into at least one corresponding control signal for the automatic transmission, wherein the shift lever is arranged in a shift guide plate imitating a manually shifted transmission, and by the guide, a defined number of forward gears and a reverse gear, in addition to an idle position, can be shifted, whereby shift signals are converted via the electronic control unit into a corresponding control of the automatic transmission in fixed gear ratios, and wherein when the clutch pedal is not actuated, the shift lever is electronically or mechanically blocked in the shift guide plate in order to avoid erroneous shifts.

2. The method according to claim 1, wherein the clutch pedal imitates a clutch actuation of a manually shifted motor vehicle with respect to pedal force and clutch function and is transferred to an automatic control unit of the automatic transmission.

3. The method according to claim 2, wherein the pedal force and the clutch function are variably controllable.

4. The method according to claim 1, wherein the shift lever can be shifted in the shift guide plate corresponding to an H shifting pattern for manually shifted motor vehicles.

5. The method according to claim 4, wherein the actuation of the shift lever in the shift guide plate imitates a catching and shifting force in manually shifted motor vehicles.

6. The method according to claim 1, wherein the electronic control unit of the automatic transmission can be switched from manual shifting to automatic shifting by a two-way switching means, wherein the control signals of the clutch pedal and the gear shift signals of the shift lever are then correspondingly suppressed.

7. The method according to claim 6, wherein electrical displays are provided in a shift guide plate, and these displays are changed into drive operation modes in the case of switching the electronic control unit to automatic operation from gear displays.

8. A device for a motor vehicle having at least a drive engine and an automatic transmission, which can be controlled in different driving modes via an electronic control unit, comprising:

a clutch mechanism with a pivotably mounted clutch pedal and an actuator simulating clutch actuation forces; a shift actuating mechanism corresponding to a manual transmission and with an actuator simulating corresponding gear positions and a low idle are provided; wherein the actuator emit electrical signals for control of the automatic transmission in a manual shift mode, wherein the clutch mechanism and the shift actuating mechanism are directly connected to the electronic control unit, and wherein the automatic transmission is a dual clutch transmission, two clutches of which are correspondingly activated in a manual shift operation via the clutch pedal and the shift actuators of which are correspondingly activated via the shift actuating mechanism.

9. The device according to claim 8, wherein an electrical two-way switch is provided, by which the motor vehicle can be switched to control with an automatic drive operation, in which signals of the clutch mechanism and a gear change of the shifting actuating mechanism are suppressed.

* * * * *